(12) United States Patent
Bigman et al.

(10) Patent No.: US 9,760,306 B1
(45) Date of Patent: Sep. 12, 2017

(54) PRIORITIZING BUSINESS PROCESSES USING HINTS FOR A STORAGE SYSTEM

(75) Inventors: Ron Bigman, Holon (IL); Adi Hirschtein, Givataim (IL); Nir Sela, Tzur Igal (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 921 days.

(21) Appl. No.: 13/596,570

(22) Filed: Aug. 28, 2012

(51) Int. Cl.
*G06F 3/06* (2006.01)
*G06F 11/34* (2006.01)
*G06F 17/30* (2006.01)

(52) U.S. Cl.
CPC .......... *G06F 3/0649* (2013.01); *G06F 3/0653* (2013.01); *G06F 3/0685* (2013.01); *G06F 11/3433* (2013.01); *G06F 17/30221* (2013.01)

(58) Field of Classification Search
CPC ................... G06F 3/061; G06F 3/0644; G06F 3/30646–3/0649; G06F 3/067; G06F 3/0685; G06F 17/30221
USPC ........................................................ 711/117
See application file for complete search history.

(56) References Cited

U.S. PATENT DOCUMENTS

| 2010/0293112 A1* | 11/2010 | Prahlad et al. ............... 705/418 |
| 2011/0185213 A1* | 7/2011 | Yoshida et al. ............... 713/340 |
| 2012/0159112 A1* | 6/2012 | Tokusho et al. .............. 711/171 |

* cited by examiner

*Primary Examiner* — Charles Rones
*Assistant Examiner* — Andrew Russell
(74) *Attorney, Agent, or Firm* — Anderson Gorecki LLP

(57) ABSTRACT

Data access is monitored in order to calculate priorities for extents of data based on extent access activity and priority of a business process associated with the extent. The priorities of the extents are used to generate priority hints for a tiered storage array. The priority may be time-dependent, including being indicative of anticipated future activity.

27 Claims, 7 Drawing Sheets

404'  Calculate priority for each extent = max($PRIORITY_{p1}$, $PRIORITY_{p2}$, ... $PRIORITY_{pn}$)

*Figure 5A*

404"  Calculate priority for each extent =

$$\sum_{p \in p} Activity(extent, p) \cdot PRIORITY(p)^2 \Big/ \sum_{p \in p} Activity(extent, p) \cdot PRIORITY(p)$$

*Figure 5B*

```
404'''    Calculate priority for
          each extent =

Max_activity=0
for p in BP loop
            if activity(extent,p)> Max_activity then
                        Chosen_priority=priority(p)
    Max_activity= activity(extent,p);
            End if
End loop
```

*Figure 6A*

```
404''''   Calculate priority for
          each extent =

Max_activity=0
for p in BP loop
        if activity(extent,p)* priority(p)> Max_activity then
                Chosen_priority= priority(p)
    Max_activity= activity(extent,p)* priority(p);
        End if
End loop
```

*Figure 6B*

700  Calculate priority for
each extent subset 1 =

<Function 1>

702  Calculate priority for
each extent subset 2 =

<Function 2>

.
.
.

704  Calculate priority for
each extent subset n =

<Function n>

Figure 7

PRIORITIZING BUSINESS PROCESSES USING HINTS FOR A STORAGE SYSTEM

CROSS-REFERENCE TO RELATED APPLICATIONS

NA

BACKGROUND OF THE INVENTION

The invention is generally related to data storage subsystems which are accessed via a network, and more particularly to tiered storage.

Enterprise data storage subsystems are used to maintain relatively large data sets. A data storage subsystem includes at least one enterprise storage array which is accessed via a host device. The storage array typically includes multiple physical storage devices, and technologies such as RAID and remote site mirroring may be used to help avoid data loss. Further, tiered levels of storage may be utilized in order to help provide both high performance and high capacity at a practical cost. Applications and devices generally access data in a storage array by sending IOs to the host device. The host device then communicates with the storage array to Read or Write data. If storage resources are organized in hierarchical tiers, data is moved between storage tiers based on IO activity. For example, data may be moved to a lower storage tier as a function of not being accessed for some period of time, or to a higher storage tier as a function of recently being accessed. Generally, data which has been recently accessed is moved to a higher storage tier characterized by faster access time, whereas data that has not been accessed for some period of time may be moved to a lower storage tier characterized by slower access time.

SUMMARY OF THE INVENTION

In accordance with an aspect, a method comprises: defining a plurality of business processes; assigning indications of priority to ones of the defined business processes; monitoring a host device associated with a tiered storage array to determine whether an IO received from an application is associated with a defined business process in order to identify an extent associated with the defined business process; calculating a priority for the extent as a function of IO activity associated with the extent and the indication of priority assigned to the business process associated with the extent; generating a priority hint based on the calculated priority; and providing the hint to the storage array, the storage array configured to utilize the hint to associate the extent with a tier of storage.

In accordance with another aspect, a computer program stored on a non-transitory computer readable medium comprises: logic which defines a plurality of business processes; logic which assigns indications of priority to ones of the defined business processes; logic which monitors a host device associated with a tiered storage array to determine whether an IO received from an application is associated with a defined business process in order to identify an extent associated with the defined business process; logic which calculates a priority for the extent as a function of JO activity associated with the extent and the indication of priority assigned to the business process associated with the extent; logic which generates a priority hint based on the calculated priority; and logic which transmits the hint to the storage array, the storage array configured to utilize the hint to associate the extent with a tier of storage.

In accordance with another aspect, an apparatus comprises: a network device including: an interface for communicating with a client device; an interface for communicating with a storage array; and logic stored on non-transitory memory and utilized by processing hardware to: define a plurality of business processes; assign indications of priority to ones of the defined business processes; monitor a host device associated with a tiered storage array to determine whether an IO received from an application is associated with a defined business process in order to identify an extent associated with the defined business process; calculate a priority for the extent as a function of IO activity associated with the extent and the indication of priority assigned to the business process associated with the extent; generate a priority hint based on the calculated priority; and provide the hint to the storage array, the storage array configured to utilize the hint to associate the extent with a tier of storage.

Existing techniques define a storage group with a policy for the devices that are affected by these storage groups. These techniques do not support dynamically changing priority based on anticipated activity. Further, these techniques operate at the device level rather than the extent level so the priority is applied to all of the business processes that use the device. Aspects associated with the presently claimed invention advantageously allow different priorities to be applied to different business processes that use the same device because priority is applied at the extent level. Further, priority can be dynamically changed, e.g., based on anticipated activity, so efficiency can be enhanced by promoting extents at selected times.

Other features and advantages will become apparent in view of the detailed description and figures.

BRIEF DESCRIPTION OF THE FIGURES

FIGS. 5A, 5B, 6A, and 6b illustrate priority calculation functions.

FIG. 7 illustrates priority calculation based on multiple functions.

DETAILED DESCRIPTION

Certain aspects of the invention including but not limited to steps shown in flow diagrams may be implemented at least in-part with a computer program stored on non-transitory memory and utilized by a physical processor and possibly other hardware components in order to achieve the described functionality. The computer program may be distributed among multiple devices or operate on a single device.

Figure 1:
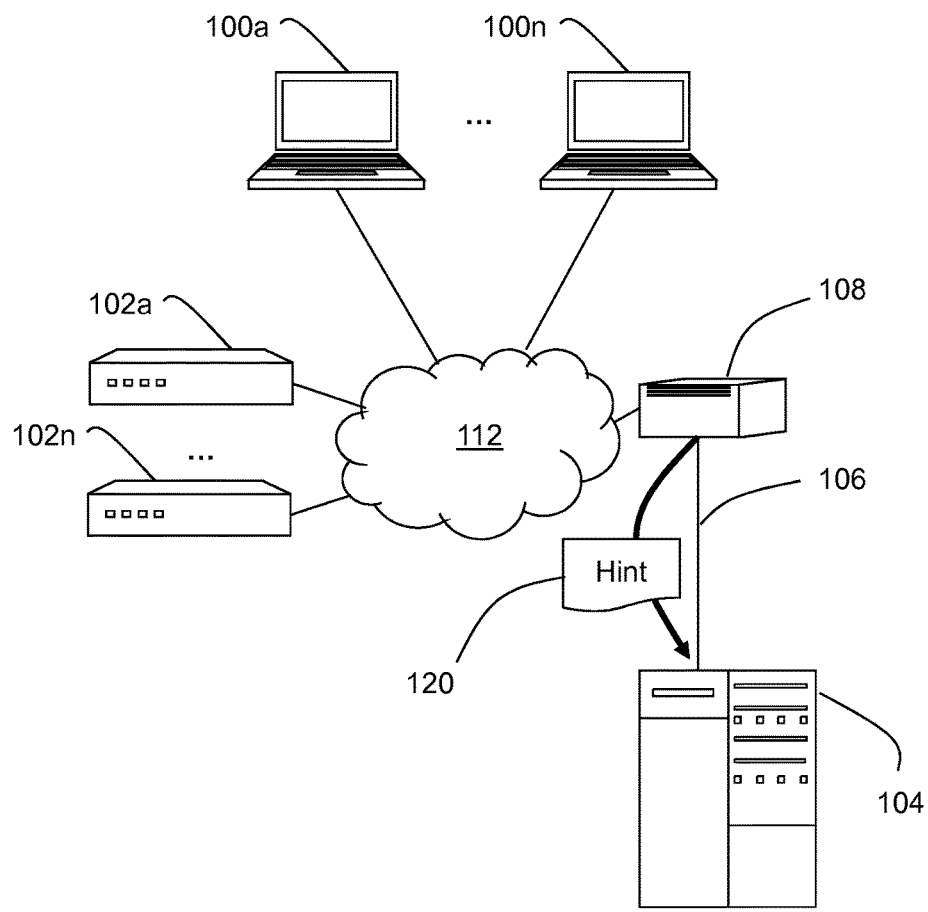
FIG. 1 illustrates a simplified enterprise network environment.

FIG. 1 illustrates a simplified network environment in which applications running on devices such as user terminals 100a through 100n (including but not limited to personal computing devices of any kind) and servers 102a through 102n (including but not limited to computing devices of any kind which perform tasks for other devices) utilize data maintained by the data storage resources of a data storage subsystem. The data storage subsystem may include an enterprise storage array 104, such as the Symmetrix system of EMC corporation, and a host device 108, which may be a type of server.

Figure 2:
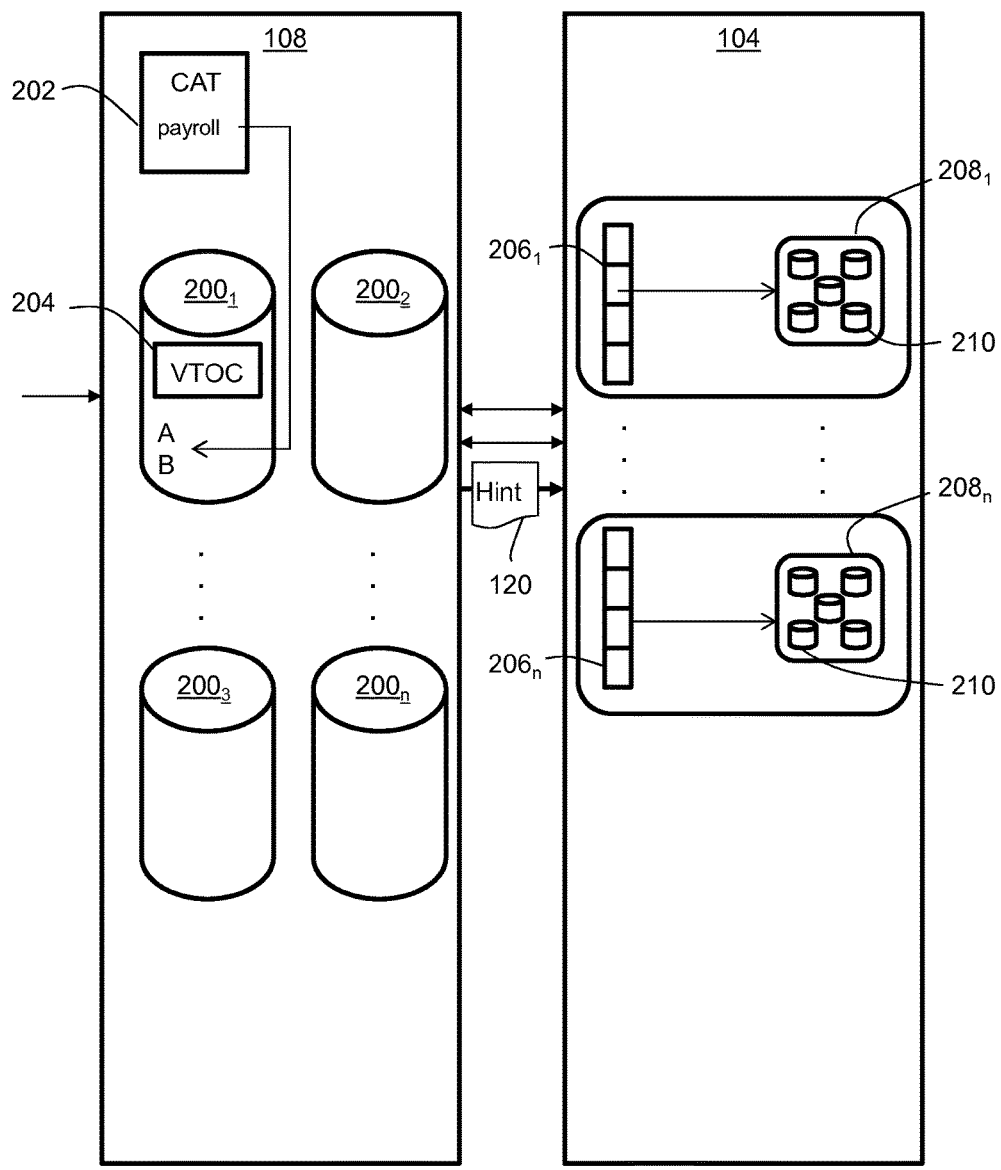
FIG. 2 illustrates a data storage subsystem.

Referring to FIG. 2, the host device 108 includes a plurality of logical volumes $200_1$ through $200_n$. A catalog 202 maintains pointers to data stored on the logical volumes. For example, a catalog entry might indicate that a file "payroll" is located on volume $200_1$ at address range A-B. Each logical volume includes a volume table of contents (VTOC) 204 which indicates a corresponding cylinder and track at which the file is located from the perspective of the host device. However, the actual data is stored by physical storage devices associated with the storage array 104 at locations which may not be known by the host, e.g., at locations other than those specified by the VTOC. The storage array 104 functions to maintain data and perform IOs in response to signaling from the host device 108. For example, if the host device receives a Read request for a set of data, the host device relays that Read request to the storage array in a format that can be processed by the storage array. The storage array then provides the data associated with the Read request to the host device, and the host device returns the data to the device which generated the Read request. In the case of a Write request the host device updates a corresponding logical volume and provides the data associated with the Write request to the storage array for storage on a physical device.

In accordance with current trends in development, the storage array 104 may be thinly provisioned such that the apparent storage capacity does not necessarily match the actual storage capacity. The thinly provisioned storage array includes pointer tables $206_1$ through $206_n$ associated with storage pools $208_1$ through $208_n$ of logical volumes 210 which are associated with physical storage devices (not illustrated). In response to an IO such as a READ or WRITE from the host 108 which indicates a location from a VTOC, the storage array 104 looks for a pointer entry in the table, e.g., $206_1$, associated with the address indicated by the IO. The pointer indicates a corresponding address for the data in a data pool, e.g., $208_1$. The READ or WRITE is then performed. If the IO is a WRITE and no pointer is found, storage space is allocated in a data pool and a new pointer entry is made in the table pointing to the allocated space.

Figure 3:
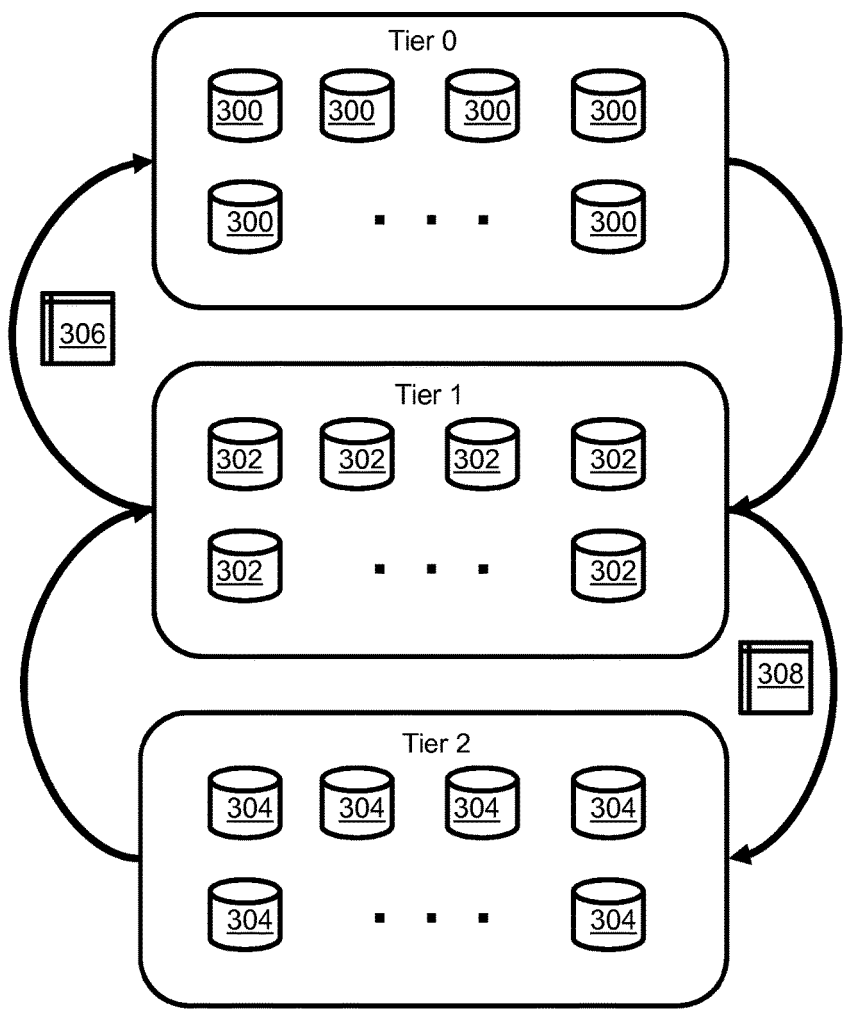
FIG. 3 illustrates tiered storage.

Referring to FIGS. 2 and 3, the storage pools $208_1$ through $208_n$ may be organized into different hierarchical tiers. A data storage system typically includes various logical data storage constructs, but data is ultimately stored on physical storage devices. Different types of physical storage devices have different performance characteristics and different costs. In a tiered storage system each tier is associated with a particular type of physical storage device. Physical storage devices which are capable of relatively faster response times are generally more costly than devices characterized by slower response times. The tiered storage system balances storage cost and storage performance by utilizing different types of storage devices and selectively storing data at the different tiers to achieve desired levels of system performance, cost and capacity. For example, the physical storage devices may include high-speed flash (EFD) arrays 300 at tier 0, Fibre Channel arrays 302 at tier 1, and SATA arrays 304 at tier 2. Tier 0 is used to store sets of data (extents) which are "hot." Each extent may be associated with a contiguous area of storage, and the highest ranked extents are selected for storage at tier 0 because it exhibits the best access time. Tier 1 is used to store extents which are "warm." In particular, the next-highest ranked (after tier 0) extents of storage are selected for storage at tier 1. The remaining extents are stored at tier 2. In general there will be greater storage capacity at tier 2 than at tier 1, and greater storage capacity at tier 1 than at tier 0. The number of tiers, types of storage devices used at the tiers, and capacity of the tiers is selected to achieve a particular performance, capacity and cost profile at the system level. A wide variety of storage devices and numbers of tiers might be utilized, and the illustrated example is simplified for ease of understanding so it should not be viewed as limiting the invention.

One aspect of selecting a tier at which to store a particular extent of data is activity. In particular, IO activity associated with an extent 306 can prompt promotion of the extent to a higher tier. Conversely, lack of IO activity associated with an extent 308 can prompt demotion of the extent to a lower tier. Statistical analysis tools are used to monitor activity on a per-extent basis over time and prompt movement or copying of data between tiers based on the level of IO activity.

Referring to FIGS. 1 through 3, another aspect of selecting a tier at which to store a particular extent of data is hinting. A hint 120 includes information which is indicative of policy, anticipated activity/inactivity, or both. For example, a particular extent or type of data may be associated with a particular tier based on performance requirements, importance, or other policies. Further, calculations may be made to predict whether and when a particular extent of data is likely to be the subject of an JO. For example, the host may utilize algorithms to recognize data access patterns and prompt the storage array with a hint to promote certain data by moving or copying that data to a higher storage tier if the calculations indicate that the data will be accessed in the near future or at some particular time (e.g., week, day, hour, minute etc.).

In accordance with one aspect a device such as the host calculates priority indicators for some or all extents based on both policy and activity. Application monitoring tools and database monitoring tools that allow a user to identify critical business processes are known. These tools can determine the type of application that is associated with an IO, which specific application is associated with an IO, the device which generated the IO, and other characteristics associated with an IO. Such tools provide the user with the ability to define a business process based on session/process parameters. For example, in an Oracle database every session stores the program name which started the session so the user can define a business process based on that parameter. Further, the user can assign a priority indication to each business process. Defining a business process and assigning a priority to that process is a policy decision. The storage system can use the priority indication in its queuing mechanism such that an JO request which is more important will be given preferential treatment over other JO requests. The storage system can also use the priority indication with an indication of activity (which may include previous activity and anticipated activity) in order to calculate priority for various extents. The extent priorities are then provided to the storage array in the form of priority hints. The tier at which the extent is stored can be selected based on absolute priority or priority relative to the priorities of other extents. Extent priority may change over time so extents may also be promoted and demoted in response to changes of priority.

Figure 4:
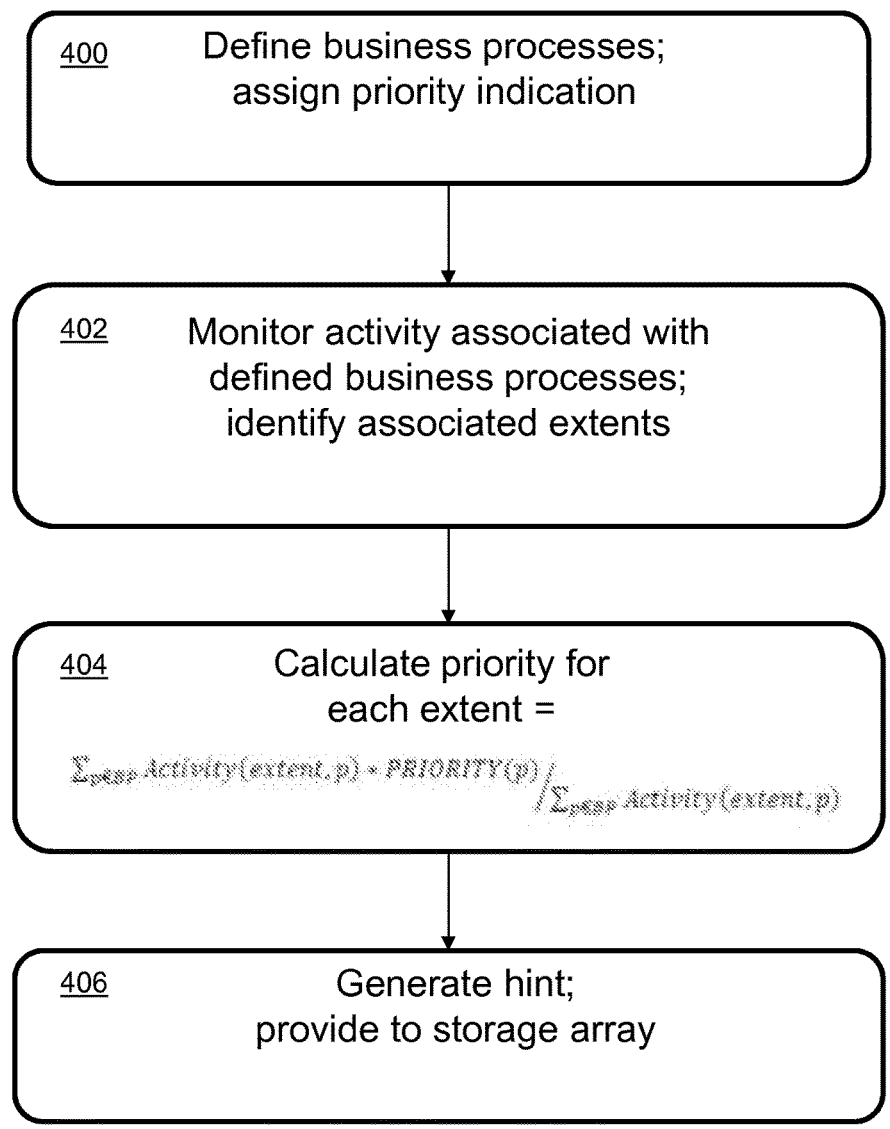
FIG. 4 illustrates calculating and utilizing priorities for some or all extents based on both policy and activity.

FIG. 4 illustrates steps associated with calculating and utilizing priorities for some or all extents based on both policy and activity. In a policy establishment step 400 a plurality of business processes are defined. In particular, the business processes are defined in terms of at least some monitorable characteristics. Examples of business processes include but are not limited to types of activities associated with a particular application, and tasks that may be associated with different applications or types of applications. An indication of priority is then assigned to at least some of the defined business processes. Each indication of priority indicates the relative importance of the associated business process. Each business process could be assigned a unique priority, or non-unique priority indicators could be used such that multiple business processes may be assigned the same level of priority. Further, priority may be constant or defined as a function of time. For example, a time-dependent priority could be defined such that the priority of the associated business process changes based on anticipated future activity in terms of, for example, time of day, day of the week, week of the month, etc. In context, a business process "Report center" program could be assigned priority 5 every weekday between 08:00-17:00 when it is anticipated to be active, and priority 1 at other times. It should also be noted that the time dependency can be based on factors other than anticipated activity. The next step 402 is to monitor activity associated with the defined business processes and identify associated extents in storage. An extent priority is then calculated for each extent in step 404 using the function:

$\Sigma_{p \in BP}$Activity(extend,p)*PRIORITY(p)/$\Sigma_{p \in BP}$Activity(extend,p), where
BP is the list of business processes, and Activity is a function returning the total activity for an extent done by the p business process. The result of the calculation is the priority of the extent. In this example the calculation produces the average priority of the extent. If the business process or priority are defined in time-dependent terms then the function may be calculated separately for each unique time period, resulting in multiple time-dependent priorities. These priorities could be used separately or are combined, e.g., by calculating the average of the priorities. For example, if half of the activity an extent receives priority 5 and half of the activity on the extent receives priority 1, then the average priority of the extent is 3. The priority for the extent is used in step 406 to generate one or more priority hints which are provided to the storage array, e.g., multiple hints when the hints are time-dependent. The storage array may use the hints to promote or demote the extent associated with the hints. The host device and storage array will also consider any activity associated with the extent to have the priority of the extent. For example, the priority can be used in a queuing mechanism such that an IO request which is more important will be given preferential treatment over other IO requests.

Other functions and combinations of functions might alternatively or additionally be used to calculate the priority of an extent. For example, and without limitation, rather than using function 404 to calculate the average priority of the extent, the calculation might be based on a function 404' that produces the maximum priority of the extent as shown in FIG. 5A. In context, if some activity occurred on an extent associated with a business process with priority 5 then that extent is considered to have the priority 5. Note that this holds true even if most of the activity of that extent comes from business processes with priority of 1. Another function 404" shown in FIG. 5B is:

$\Sigma_{p \in BP}$Activity(extend,p)*PRIORITY(p)$^2$/$\Sigma_{p \in BP}$Activity(extend,p)*PRIORITY(p)

This function 404" has the effect of weighting the calculation such that the business processes with higher priority will have greater influence on the priority of the extent. In context, where half of the activity on an extent receives priority 5 and half of the activity on the extent receives priority 1, the following extent priority results:

$$1 = X*5^2 + X*1^2/X*5 + X*1 = \frac{26}{6} = 4\frac{1}{3}$$

Note that the weighted extent priority is less than the max but greater than the average, at least in this example. Another function 404''' illustrated in FIG. 6A would utilize the priority of the business process that most greatly affected the extent. In context, where an extent has been used by two business processes, one with priority 1 and one with priority 5, but 51% of the overall activity (in terms of number of IOs or some other metric) is associated with the business process having priority 1 then the extent is assigned a priority corresponding to only the business process having priority 1. If 51% or more of the overall activity was associated with the business process having priority 5 then the extent would be assigned a priority corresponding to that business process. Another function 404'''' illustrated in FIG. 6B weights according to activity and priority. For example, the BP with the largest value of Activity(extent, p)*PRIORITY(p) could be selected for use in the function. Any of the described functions and variations thereof could be used in the priority calculation of FIG. 4 in order to generate the hint.

Referring to FIG. 7, multiple functions might be utilized. In particular, a first function <Function 1> could be used to calculate priority for a first subset of extents in step 700, a second function <Function 2> could be used to calculate priority for a second subset of extents in step 702, and so on to n subsets in step 704. In context, the maximum priority function could be utilized to calculate priorities for extents associated with certain selected business processes and the average priority function could be utilized to calculate priorities for extents associated with other business processes, thereby favoring the selected business processes over the other business processes.

It should be noted that although the convention used in this description that higher priority numbers correspond to higher levels of priority (e.g., priority 5 is more important than priority 1) is not to be viewed as a limitation. Any of various naming and numbering conventions might be used, and an inverse convention could be used with the aid of a MAX_PRIORITY+1−CUR_PRIORITY function.

While the invention is described through the above exemplary examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Accordingly, the invention should not be viewed as limited except by the scope and spirit of the appended claims.

What is claimed is:
1. A method comprising:
defining a plurality of business processes;
assigning indications of priority to ones of the defined business processes;
monitoring a host device associated with a tiered storage array to determine whether an IO received from an application is associated with a defined business process in order to identify an extent associated with the defined business process;
calculating a priority for the extent as a function of IO activity associated with the extent and the indication of priority assigned to the business process associated with the extent, wherein calculating the priority for the extent includes weighting the calculation such that business processes characterized by higher priority have greater influence on the priority of the extent;
generating a priority hint based on the calculated priority; and
providing the hint to the storage array, the storage array configured to utilize the hint to associate the extent with a tier of storage.

2. The method of claim 1 including assigning time-dependent indications of priority to ones of the defined business processes.

3. The method of claim 2 wherein calculating the priority for the extent includes separately calculating priority for each of multiple time periods.

4. The method of claim 3 including generating a hint for each time period.

5. The method of claim 1 wherein calculating the priority for the extent includes calculating average priority of the extent.

6. The method of claim 1 wherein calculating the priority for the extent includes calculating the priority based only on activity and maximum priority associated with the extent.

7. The method of claim 1 wherein calculating the priority for the extent includes calculating the priority based only on activity and priority of a business process which had a maximum of all activity associated with the extent.

8. The method of claim 1 wherein calculating the priority for the extent includes calculating the priority based only on activity and priority of a business process characterized by a greatest value of activity*priority associated with the extent.

9. The method of claim 1 including calculating priorities for a plurality of extents by utilizing multiple functions.

10. A computer program stored on a non-transitory computer readable medium comprising:
logic which defines a plurality of business processes;
logic which assigns indications of priority to ones of the defined business processes;
logic which monitors a host device associated with a tiered storage array to determine whether an TO received from an application is associated with a defined business process in order to identify an extent associated with the defined business process;
logic which calculates a priority for the extent as a function of TO activity associated with the extent and the indication of priority assigned to the business process associated with the extent, wherein the logic which calculates the priority for the extent includes logic which weights the calculation such that business processes characterized by higher priority have greater influence on the priority of the extent;
logic which generates a priority hint based on the calculated priority for the extent; and
logic which transmits the hint to the storage array, the storage array configured to utilize the hint to associate the extent with a tier of storage.

11. The computer program of claim 10 including logic which assigns time-dependent indications of priority to ones of the defined business processes.

12. The computer program of claim 11 including logic which separately calculates priority for the extent for each of multiple time periods.

13. The computer program of claim 12 including logic which generates a hint for each time period.

14. The computer program of claim 10 wherein the logic which calculates the priority for the extent includes logic which calculates average priority of the extent.

15. The computer program of claim 10 wherein the logic which calculates the priority for the extent includes logic which calculates the priority based only on activity and maximum priority associated with the extent.

16. The computer program of claim 10 wherein the logic which calculates the priority for the extent includes logic which calculates the priority based only on activity and priority of a business process which had a maximum of all activity associated with the extent.

17. The computer program of claim 10 wherein the logic which calculates the priority for the extent includes logic which calculates the priority based only on activity and priority of a business process characterized by a greatest value of activity*priority associated with the extent.

18. The computer program of claim 10 wherein the logic which calculates the priority for the extent includes logic which utilizes multiple functions to calculate priorities for multiple extents.

19. An apparatus comprising:
a network device including:
an interface for communicating with a client device;
an interface for communicating with a storage array; and
logic stored on non-transitory memory and utilized by processing hardware to:
define a plurality of business processes;
assign indications of priority to ones of the defined business processes;
monitor a host device associated with a tiered storage array to determine whether an IO received from an application is associated with a defined business process in order to identify an extent associated with the defined business process;
calculate a priority for the extent as a function of IO activity associated with the extent and the indication of priority assigned to the business process associated with the extent wherein the calculation is weighted such that business processes characterized by higher priority have greater influence on the priority of the extent;
generate a priority hint based on the calculated priority; and
provide the hint to the storage array, the storage array configured to utilize the hint to associate the extent with a tier of storage.

20. The apparatus of claim 19 wherein time-dependent indications of priority are assigned to ones of the defined business processes.

21. The apparatus of claim 20 wherein priority for the extent is separately calculated for each of multiple time periods.

22. The apparatus of claim 21 wherein a hint is generated for each time period.

23. The apparatus of claim 19 wherein the priority for the extent is based on average priority of the extent.

24. The apparatus of claim 19 wherein the priority for the extent is based only on activity and maximum priority associated with the extent.

25. The apparatus of claim 19 wherein the priority for the extent is calculated based only on activity and priority of a business process which had a maximum of all activity associated with the extent.

26. The apparatus of claim 19 wherein the priority for the extent is calculated based only on activity and priority of a business process characterized by a greatest value of activity*priority associated with the extent.

27. The apparatus of claim 19 including calculating different i priorities for a plurality of extents by utilizing multiple functions.

\* \* \* \* \*